Patented Apr. 20, 1937

2,077,863

UNITED STATES PATENT OFFICE 2,077,863

DYESTUFFS OF THE OXAZINE SERIES AND A PROCESS OF PREPARING THEM

Karl Thiess, Frankfort-on-the-Main-Sindlingen, Germany, assignor to General Aniline Works, Inc., New York, N. Y., a corporation of Delaware No Drawing. Application May 31, 1933, Serial No. 673,774. In Germany June 4, 1932

11 Claims. (Cl. 260—28)

The present invention relates to dyestuffs of the oxazine series and to a process of preparing them.

I have found that intensely colored red, violet, blue and bluish-green oxazine dyestuffs are obtainable by heating at a temperature between about 150° C. and about 300° C. a compound of the probable general formula:

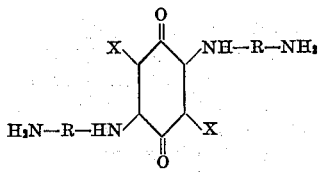

wherein X represents hydrogen or halogen and R an aromatic radical containing at least two benzene nuclei the one of which is bound to the NH-group and the other to the $NH_2$-group of the molecule, in the presence of one of the usual acylating agents.

As such usual acylating agents there may be used, for instance, acetic acid anhydride, benzoyl-chloride, benzo-trichloride, para-toluene-sulfochloride or the like. The reaction is advantageously effected by boiling the components in a solvent of high boiling point with or without addition of an oxidizing agent. The new products thus obtained may directly be used as pigments or they may be transformed by sulfonation into water-soluble dyestuffs which have an especially good affinity for the vegetable fiber. Some of them have a very good fastness to washing. In the form of the barium-, calcium- or another suitable salt the dyestuffs sulfonic acids may likewise be used as pigments.

The products obtainable according to the process of the present invention are new; for instance, there are obtained dyestuffs of the following probable constitution:

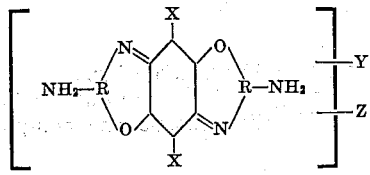

wherein X represents hydrogen or halogen, R an aromatic radical containing at least two benzene nuclei, the one of which is bound in two adjacent positions to the oxygen- and nitrogen-atoms and the other of which is bound to the $NH_2$-group of the molecule, Y means that the compounds may contain acyl groups and Z that the compounds may be sulfonated.

The diamino-arylamino-quinones used as starting materials in the process of the present invention may, for instance, be obtained by heating one molecule of a tetra-halogen-quinone with 2 mols of an aromatic diamine containing at least 2 benzene nuclei such as, for instance, benzidine, naphthidine, 4.4'-diamino-diphenyl-urea, 4.4'-diamino-diphenyl-sulfide, 4.4'-diamino-diphenyl-methane, 4.4'-diamino-carbazole, 4.4'-diamino-diphenylamine, in a diluent such as, for instance, alcohol or water (cf. Berichte der deutschen Chemischen Gesellschaft, volume 46, page 2904).

The following examples serve to illustrate the invention, but they are not intended to limit it thereto, the parts being by weight, unless stated otherwise:

(1) 50 parts of the condensation product from 2 mols of benzidine and one mol. of tetrachloro-quinone (obtainable by boiling the components for several hours in alcohol in the presence of an acid binding agent) are heated at 150° C. to 160° C. for 2 hours in 750 parts of nitrobenzene in the presence of 50 parts of benzoyl chloride and further boiled for 7 hours. The color of the mass turns deep red-violet. After cooling, the mass is filtered and the solid matter is washed with nitrobenzene, alcohol and finally with water. After drying, a good yield of a black-violet powder, having, when spread on clay, a metallic luster and dissolving in concentrated sulfuric acid to a deep blue solution, is obtained. When this solution is poured into water, the new dyestuff precipitates in the form of red-violet flakes. By treating it with fuming sulfuric acid of 20% of $SO_3$ the product may be sulfonated. The new sulfonic acid dyes cotton violet tints from a neutral dyebath or a dyebath rendered weakly alkaline by sodium carbonate. The dyeings have a very good fastness to washing, to acids and to light.

By effecting the sulfonation in sulfuric acid mono-hydrate or in concentrated sulfuric acid of 66° Bé. in such a manner that 5 parts of the dyestuff are dissolved in 100 parts by volume of one of the said acids and the solution is stirred at 90° C. to 95° C. for 14 hours and then at 180° C. to 185° C. for further 14 hours, a dyestuff sulfonic acid is obtained which dyes cotton from a neutral bath containing salt intense blue tints.

(2) By replacing the benzoylchloride used in Example 1 by 60 parts of benzo-trichloride, a dyestuff is obtained which is very similar to that described in Example 1.

(3) 10 parts of the condensation product obtainable from one mol. of tetrachloro-quinone and 2 mols of meta-nitrobenzidine in alcohol are boiled for 15 hours in 150 parts of nitrobenzene in the presence of 9 parts of benzoylchloride. The dyestuff is isolated as described in Example 1. It forms a dark red powder which has, when spread on clay, an intense metallic luster. The dyestuff dissolves in concentrated sulfuric acid to a clear blue solution. When this solution is poured into water, the dyestuff precipitates in the form of violet-red flakes.

(4) 10 parts of the condensation product obtainable from chloranil and diphenyline (ortho-para'-diaminodiphenyl) in alcohol, are treated as described in Example 3. The dyestuff thus obtained forms a greenish powder having a metallic luster and dissolving in concentrated sulfuric acid to a greenish-blue solution; when this solution is poured on ice, the dyestuff precipitates in the form of red flakes.

(5) 10 parts of the condensation product obtainable from chloranil and symmetrical 4.4'-diamino-diphenyl-urea in alcohol, are treated as described in Example 3. The new dyestuff thus obtained forms a dark violet powder having a metallic luster and dissolving in concentrated sulfuric acid to a clear greenish-blue solution. When this solution is poured on ice, the dyestuff precipitates in the form of brilliant blue-violet flakes. By strongly sulfonating the dyestuff, a water-soluble dyestuff is obtained which dyes cotton violet-blue tints from a neutral bath or a bath rendered weakly alkaline by sodium carbonate.

(6) By replacing the 750 parts of nitrobenzene used in Example 1 by 750 parts of trichlorobenzene, by adding thereto besides benzoyl-chloride 15 parts of sodium nitrite and by boiling the whole for 15 hours, a dyestuff is obtained which is similar to that obtained according to Example 1.

I claim:

1. The process which comprises heating at a temperature between about 150° C. and about 300° C. a compound of the general formula:

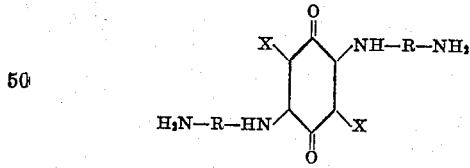

wherein X represents a member of the group consisting of hydrogen and halogen and R an aromatic radical of the benzene and naphthalene series, containing at least two benzene nuclei the one of which is bound to the NH-group and the other to the NH2-group of the molecule, in the presence of one of the usual acylating agents.

2. The process which comprises heating at a temperature between about 150° C. and about 300° C. a compound of the general formula:

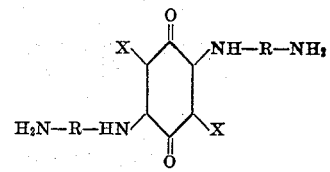

wherein X represents a member of the group consisting of hydrogen and halogen and R an aromatic radical of the benzene and naphthalene series, containing at least two benzene nuclei the one of which is bound to the NH-group and the other to the NH2-group of the molecule, in the presence of one of the usual acylating agents and sulfonating according to one of the known methods the products thus obtained.

3. The process which comprises boiling in a high boiling solvent a compound of the general formula:

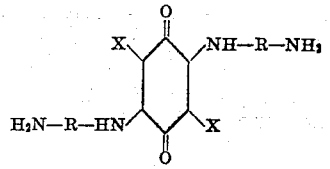

wherein X represents a member of the group consisting of hydrogen and chlorine and R a diphenyl radical the one nucleus of which is bound to the NH-group and the other to the NH2-group of the molecule, in the presence of one of the usual acylating agents.

4. The process which comprises boiling in a high boiling solvent a compound of the general formula:

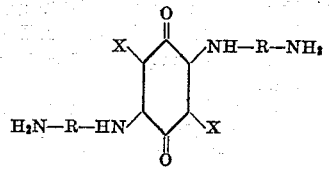

wherein X represents a member of the group consisting of hydrogen and chlorine and R a diphenyl radical the one nucleus of which is bound to the NH-group and the other to the NH2-group of the molecule, in the presence of one of the usual acylating agents and sulfonating according to one of the known methods the products thus obtained.

5. The process which comprises boiling for some hours in nitrobenzene the compound of the formula:

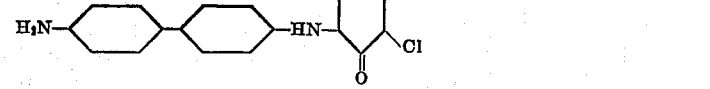

in the presence of benzoylchloride.

6. The process which comprises boiling for some hours in nitrobenzene the compound of the formula:

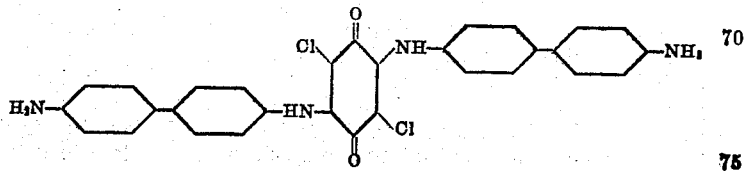

in the presence of benzoylchloride and sulfonating according to one of the known methods the products thus obtained.

7. A member selected from the group consisting of the compounds of the general formula:

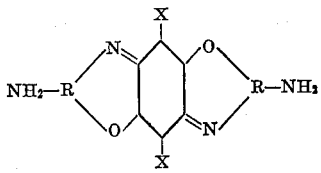

wherein X represents a member of the group consisting of hydrogen and halogen, R an aromatic radical of the benzene and naphthalene series containing at least two benzene nuclei the one of which is bound in two adjacent positions to the oxygen- and nitrogen-atoms and the other of which is bound to the $NH_2$-group and the compounds of the said general formula wherein the molecule contains substituents selected from the group consisting of acyl and sulfonic acid groups.

8. A member selected from the group consisting of the compounds of the general formula:

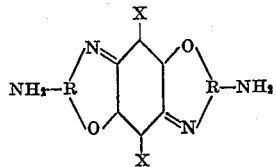

wherein X represents a member of the group consisting of hydrogen and halogen, R a diphenyl radical the one nucleus of which is bound in two adjacent positions to the oxygen- and nitrogen-atoms and the other nucleus of which is bound to the $NH_2$-group, and the compounds of the said general formula wherein the molecule contains substituents selected from the group consisting of acyl and sulfonic acid groups.

9. A member selected from the group consisting of the compound of the formula:

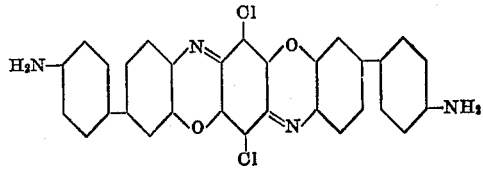

and the compounds of the said general formula wherein the molecule contains substituents selected from the group consisting of benzoyl and sulfonic acid groups, dyeing cotton from a neutral dyebath or a dyebath rendered weakly alkaline by sodium carbonate violet or blue tints of very good fastness to washing, to acids and to light.

10. A member selected from the group consisting of the compound of the formula:

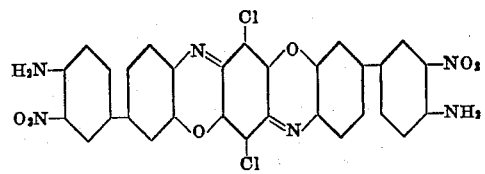

and the compounds of the said general formula wherein the molecule is substituted by benzoyl groups, forming a dark red powder having on clay an intense metallic luster and dissolving in concentrated sulfuric acid to a clear blue solution.

11. A member selected from the group consisting of the compound of the formula:

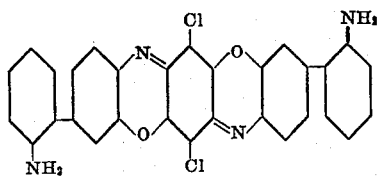

and the compounds of the said general formula wherein the molecule is substituted by benzoyl groups, forming a greenish powder having a metallic luster and dissolving in concentrated sulfuric acid to a greenish-blue solution.

KARL THIESS.